US006075587A

United States Patent [19]

Shiau

[11] Patent Number: 6,075,587

[45] Date of Patent: Jun. 13, 2000

[54] APPARATUS FOR RECOGNIZING THE AUTHENTICITY OF PAPER CURRENCY, ID CREDIT CARD, ETC.

[76] Inventor: Jong-Jiing Shiau, 11F, No. 288-2, Ta-Ya Rd., Taichung City, Taiwan

[21] Appl. No.: 09/327,177

[22] Filed: Jun. 7, 1999

[51] Int. Cl.[7] .......... G06K 9/74

[52] U.S. Cl. .......... 356/71; 194/206; 194/207; 250/461.1

[58] Field of Search .......... 315/225, 362; 356/71; 194/207, 206, 212, 214, 4; 250/461.1, 495.1; 109/25, 29

[56] References Cited

U.S. PATENT DOCUMENTS

| | | | |
|---|---|---|---|
| 4,480,177 | 10/1984 | Allen | 109/29 |
| 5,111,114 | 5/1992 | Wang | 315/225 |
| 5,259,490 | 11/1993 | Gardellini | 194/207 |
| 5,593,017 | 1/1997 | Powell et al. | 194/212 |
| 5,607,040 | 3/1997 | Mathurin, Sr. | 356/71 |
| 5,640,463 | 6/1997 | Csulits | 194/207 |
| 5,727,667 | 3/1998 | Nye | 194/207 |
| 5,915,518 | 6/1999 | Hopwood et al. | 356/71 |
| 5,918,960 | 7/1999 | Hopwood et al. | 356/71 |
| 5,942,759 | 8/1999 | Romano | 250/461.1 |
| 5,954,180 | 9/1999 | Critchley | 194/207 |
| 5,960,103 | 9/1999 | Graves et al. | 194/207 |
| 5,974,883 | 11/1999 | Ross | 194/206 |

*Primary Examiner*—Don Wong
*Assistant Examiner*—Thuy Vinh Tran
*Attorney, Agent, or Firm*—Bacon & Thomas

[57] ABSTRACT

An apparatus for recognizing the authenticity of paper currency, credit cards, and the like, which includes a casing, a mat mounted inside the casing for holding a paper currency, credit card, or the like for recognition, the mat having a semitransparent center area, incandescent lamp means mounted inside the casing and controlled to emit light through the semitransparent center area at the mat from the bottom, a lift cover covered on the casing, an ultraviolet lamp mounted inside the lift cover, a calculator mounted outside the lift cover, and a reflector mounted inside the lift cover to reflect light from the ultraviolet lamp toward the mat.

6 Claims, 10 Drawing Sheets

APPARATUS FOR RECOGNIZING THE AUTHENTICITY OF PAPER CURRENCY, ID CREDIT CARD, ETC.

BACKGROUND OF THE INVENTION

The present invention relates to an apparatus for recognizing the fluorescent mark, embossed seal, authenticity recognition line on paper currency, credit cards, and the like, so as to help the user recognize the authenticity of the paper currency, credit card, and the like.

In the modern society, utilitarianism has become in vogue. In consequence of the rising of utilitarianism, people try every possible way to get money, and criminal-committing try different technology to make counterfeit credit cards, paper currency. In order to prevent a counterfeit, a paper currency is made having a special identification mark and/or seal means for recognition. However, it is not easy to recognize the identification mark or seal means of a paper currency by visual. Various apparatus have been developed for recognizing the authenticity of paper currency, credit cards, or ID cards. However, these apparatus are commonly heavy and expensive, and provide one particular function only. For example, an apparatus for recognizing the authenticity of paper currency cannot be used for recognizing the authenticity of credit cards.

SUMMARY OF THE INVENTION

It is one object of the present invention to provide an apparatus which is practical for recognizing the embossed seal and authenticity recognition line on a paper currency as well as the fluorescent mark in a credit card. It is another object of the present invention to provide an apparatus for recognizing the authenticity of paper currency, credit cards, ID cards, and the like, which is inexpensive to manufacture, and convenient for carrying by hand. It is still another object of the present invention to provide an apparatus for recognizing the authenticity of paper currency, credit cards, ID cards, and the like, which provides an additional function of calculation. To achieve these and other objects, there is provided an apparatus for recognizing the authenticity of paper currency, credit cards, and the like, which comprises a casing, a mat mounted inside the casing for holding a paper currency, credit card, or the like for recognition, the mat having a semitransparent center area, incandescent lamp means mounted inside the casing and controlled to emit light through the semitransparent center area at the mat from the bottom, a lift cover covered on the casing, a calculator mounted outside the lift cover, an ultraviolet lamp mounted inside the lift cover, a reflector mounted inside the lift cover to reflect light from the ultraviolet lamp toward the mat, main switch controlled to turn on/off the ultraviolet lamp, and a microswitch controlled by the main switch to turn on/off the incandescent lamp means.

DETAILED DESCRIPTION OF THE PREFERRED EMBODIMENT

Figure 1:
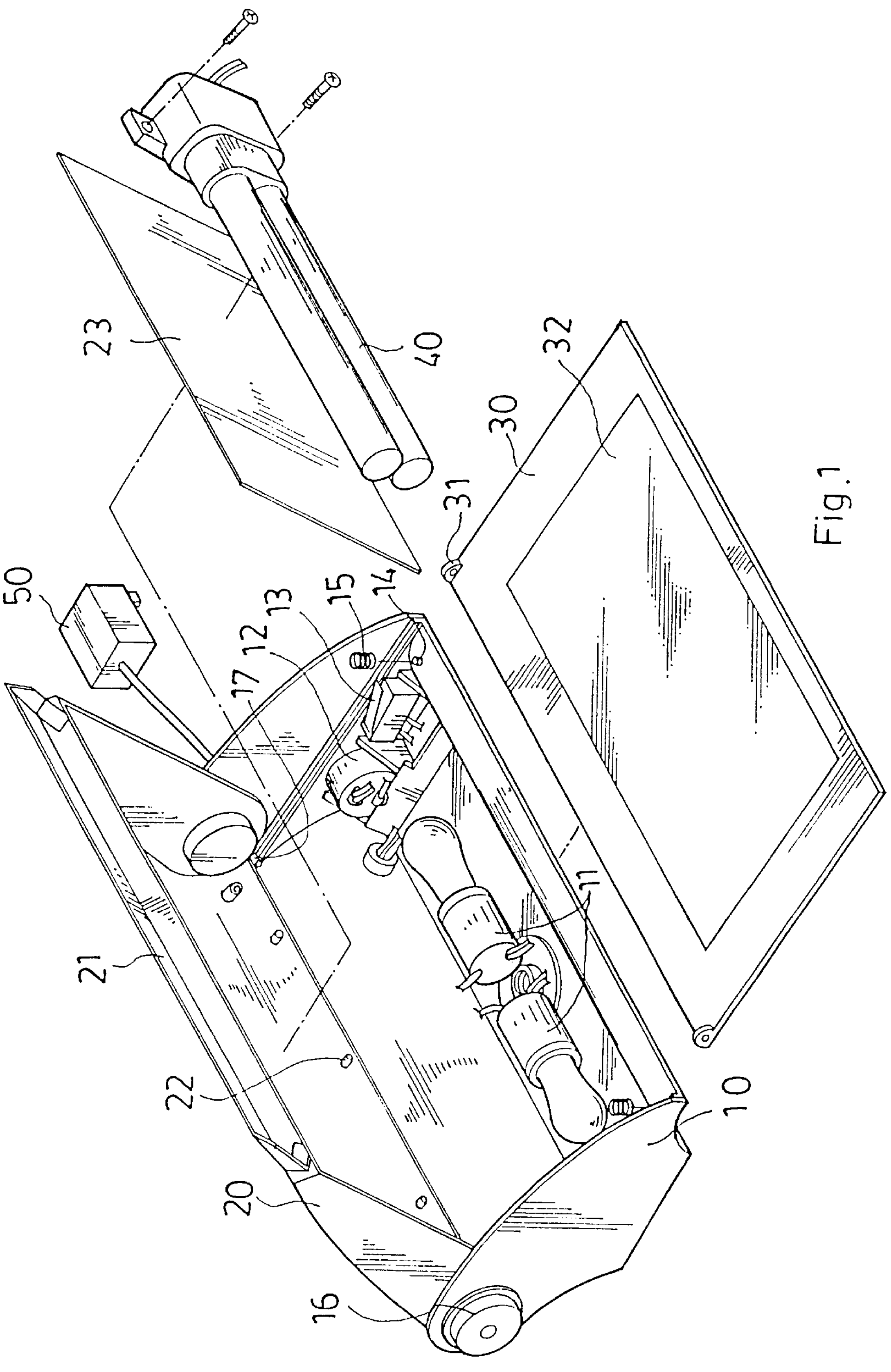
FIG. 1 is an exploded view of the present invention.
Figure 2:
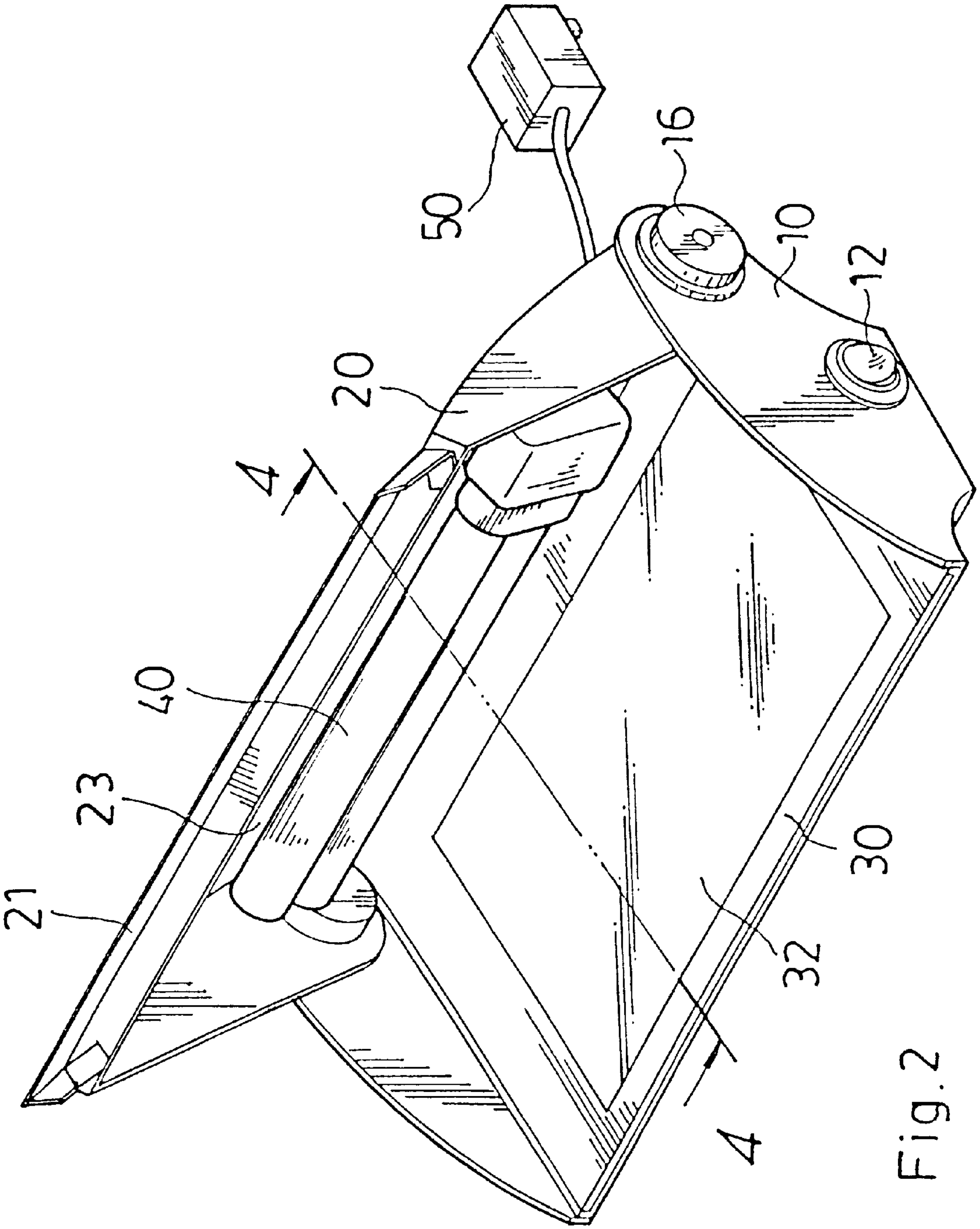
FIG. 2 shows the apparatus opened.
Figure 3:
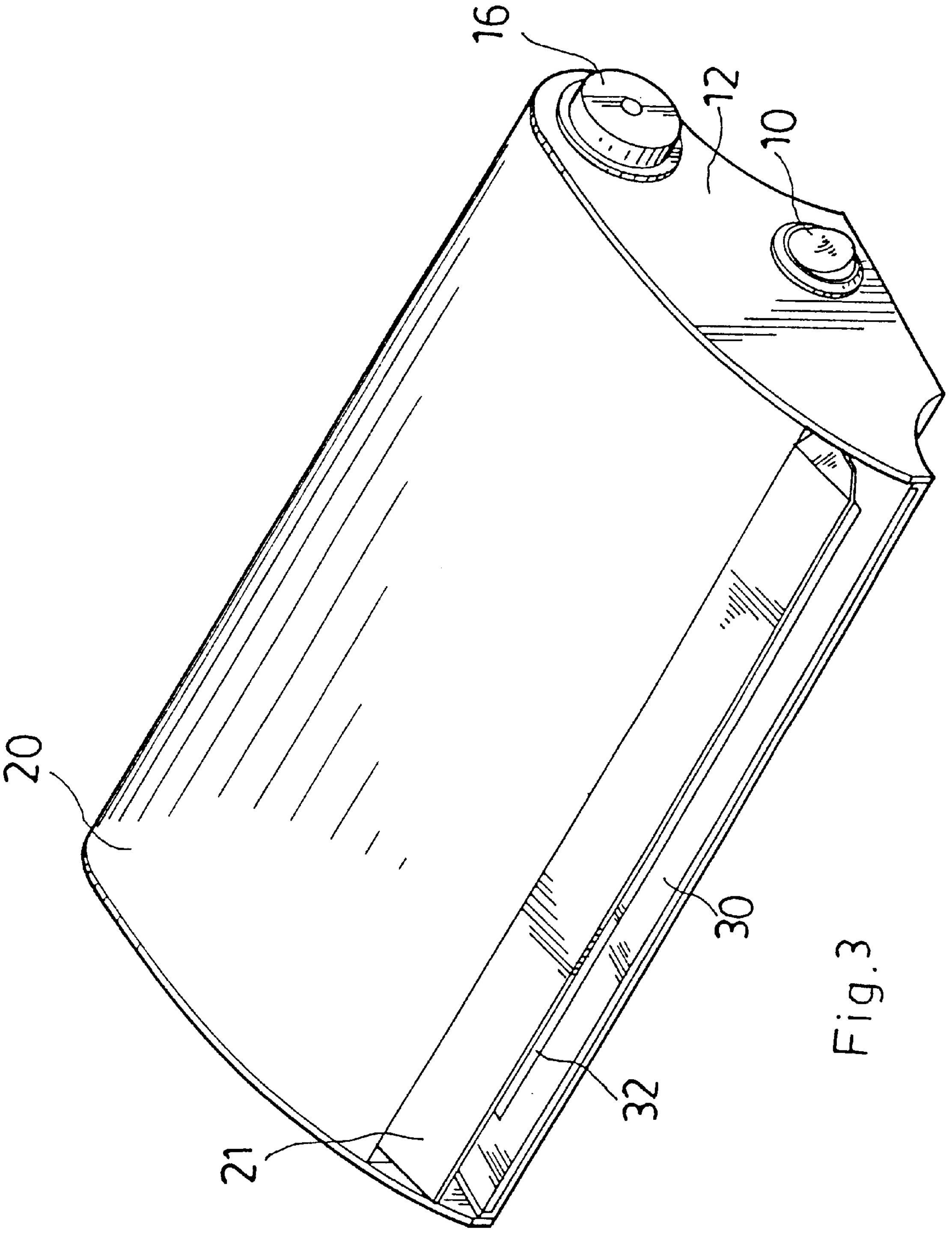
FIG. 3 shows the apparatus closed.
Figure 4A:
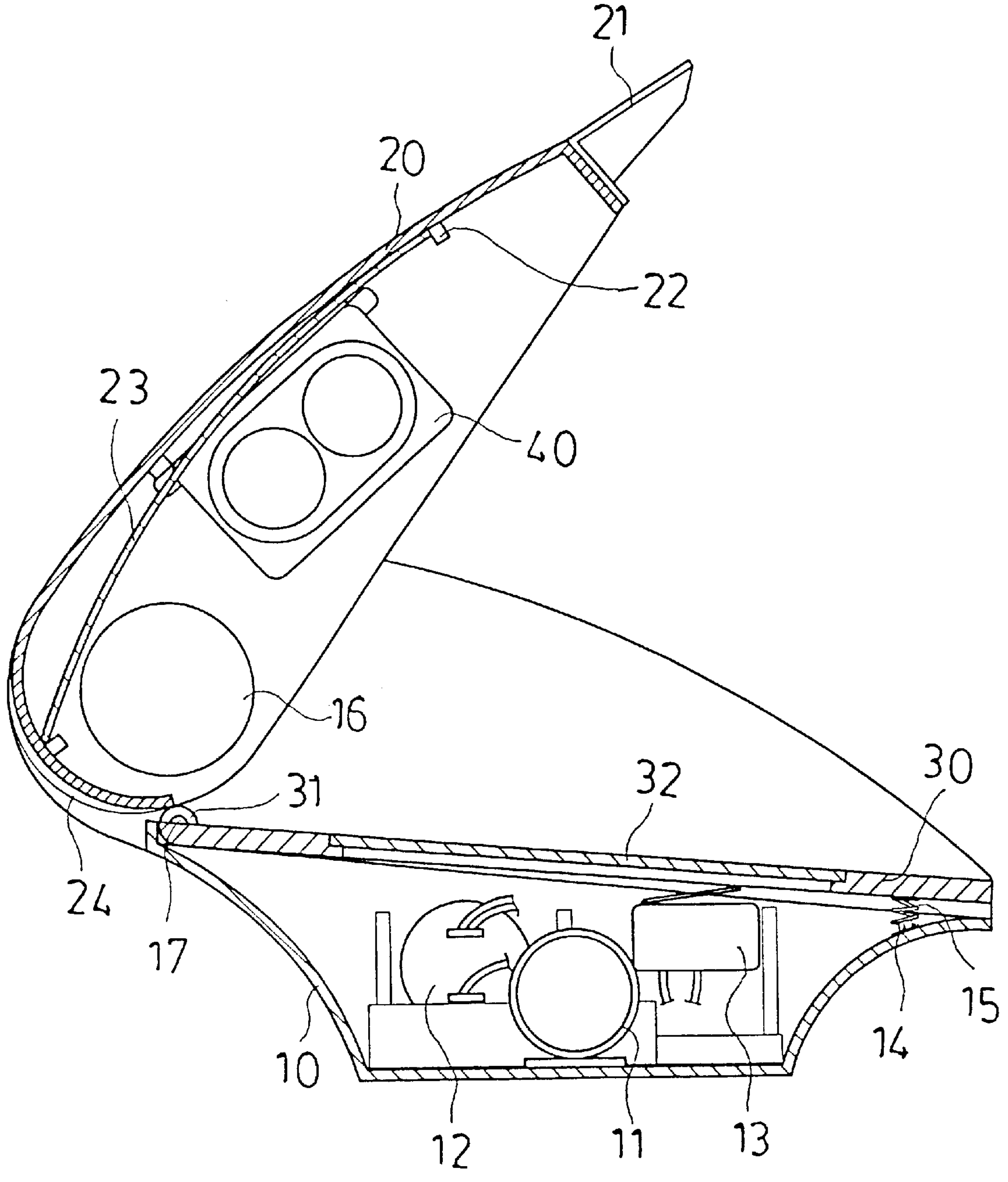
FIG. 4A is a sectional view taken along line 4—4 of FIG. 3.
Figure 5:
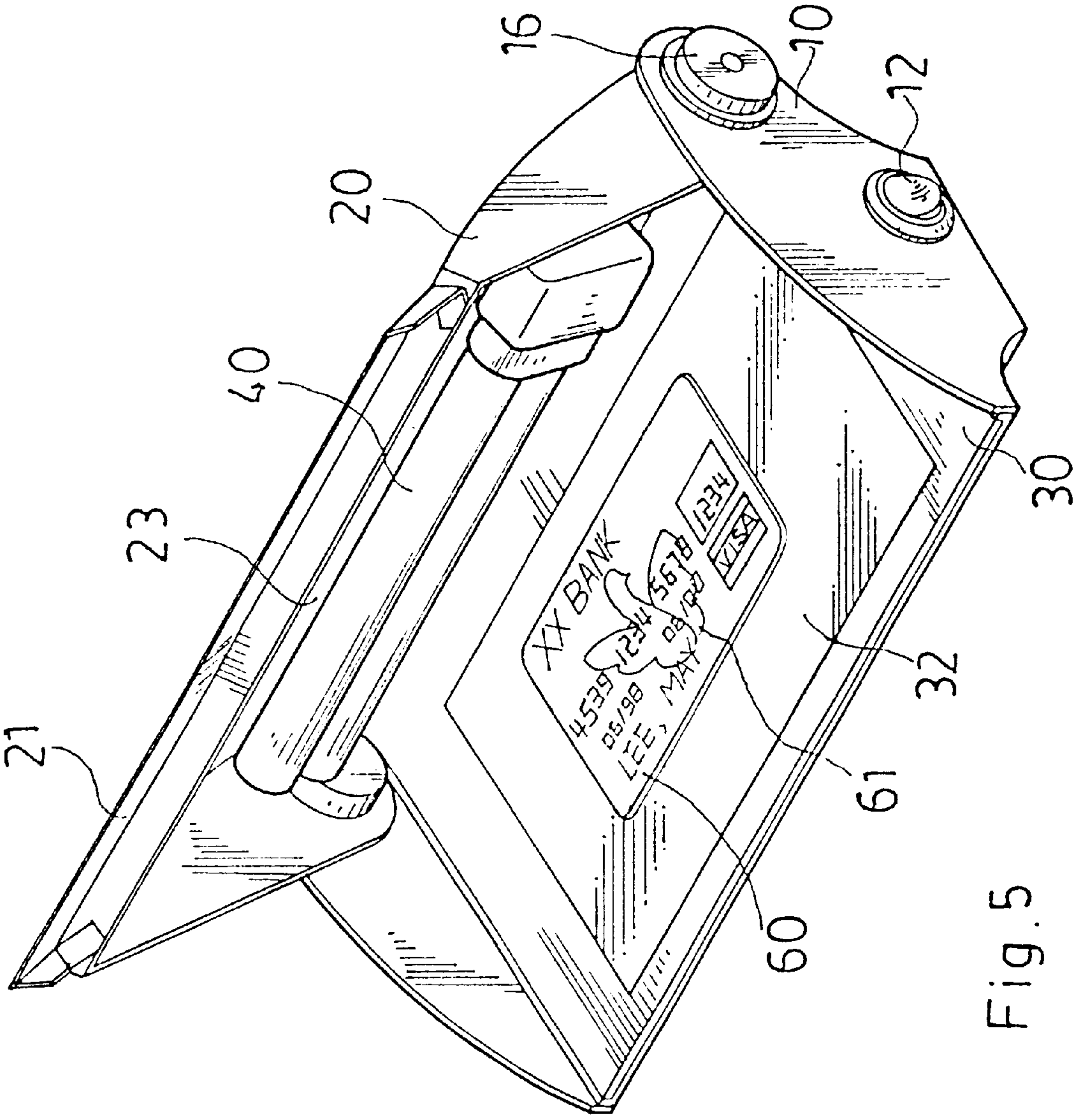
FIG. 5 shows an application example of the present invention.

Referring to Figures from 1 through 7, a lift cover 20 is pivoted to a casing 10 by two pivot shafts 16, and a mat 30 is pivotably mounted in between the lift cover 20 and the casing 10. The pivot shafts 16 are bilaterally connected between the lift cover 20 and the casing 10 at a rear side, each having a raised portion 17 at an inner side inside the lift cover 20. Two incandescent lamps 11 are reversely arranged in the casing 10 in a line. A main switch 12 is provided in the casing 10 at one lateral side for power on/off control. A microswitch 13 is provided in the casing 10 at one lateral side adjacent to the main switch 12 for controlling the operation of the incandescent lamp 11. Two spring holders 14 are bilaterally provided at a horizontal front flange thereof. Two spring members 15 are respectively fastened to the spring holders 14. The spring members 15 each have a fixed bottom end respectively fixedly fastened to the spring holders 14, and a free top end. The lift cover 20 comprises a semitransparent front shade 21, that admits light. An ultraviolet lamp 40 is provided inside the lift cover 20. A reflector 23 is provided between the lift cover 20 and the ultraviolet lamp 40 to reflect the light of the ultraviolet lamp 40. The lift cover 20 has locating rods 22 raised from its inside wall for the positioning of the reflector 23. The reflector 23 is resilient sheet member that can be curved, and then set into position and retained between the locating rods 22 (see FIG. 4A). If the main switch 12 is maintained switched on after each use, the light of the ultraviolet lamp 40 passes through the semitransparent front shade 21, giving a message to the user that the main switch 12 is not switched off. Radiating fins 24 are provided at the back side of the lift cover 20 to dissipate heat from the ultraviolet lamp 40. The mat 30 comprises two eyed lugs 31 bilaterally raised from the rear side thereof and respectively pivotably coupled to the raised portions 17 at the pivot shafts 16. The front side of the mat 30 is supported on the spring members 15 at the spring holders 14. The mat 30 has a semitransparent center area 32 through which the light of the incandescent lamps 11 passes. The ultraviolet lamp 40 has one terminal connected to a first terminal of an electric plug 50 through a ballast 41, and the other terminal connected to a second terminal of the electric plug 50 through the main switch 12. The incandescent lamps 11 each have a first terminal connected to the second terminal of the electric plug 50 through the main switch 12, and a second terminal connected to the first terminal of the electric plug 50 through the microswitch When in use, the electric plug 50 is connected to power supply, then the main switch 12 is switched on to turn on the ultraviolet lamp 40, then the lift cover 20 is opened, and then the credit card 60 is put on the semitransparent center area 32 at the mat 30 (see FIG. 5), enabling the credit card 60 to receive the radiation of the ultraviolet lamp 40. If the credit card 60 is authentic, the fluorescent mark 61 which is embedded in the credit card 60 is shown under the radiation of the ultraviolet lamp 40. If no fluorescent mark 61 is shown under the radiation of the ultraviolet lamp 40, the credit card 60 is regarded as a counterfeit and must be rejected. When recognizing the authenticity of a paper currency 62, the paper currency 62 is put on the semitransparent center area

Figure 4B:
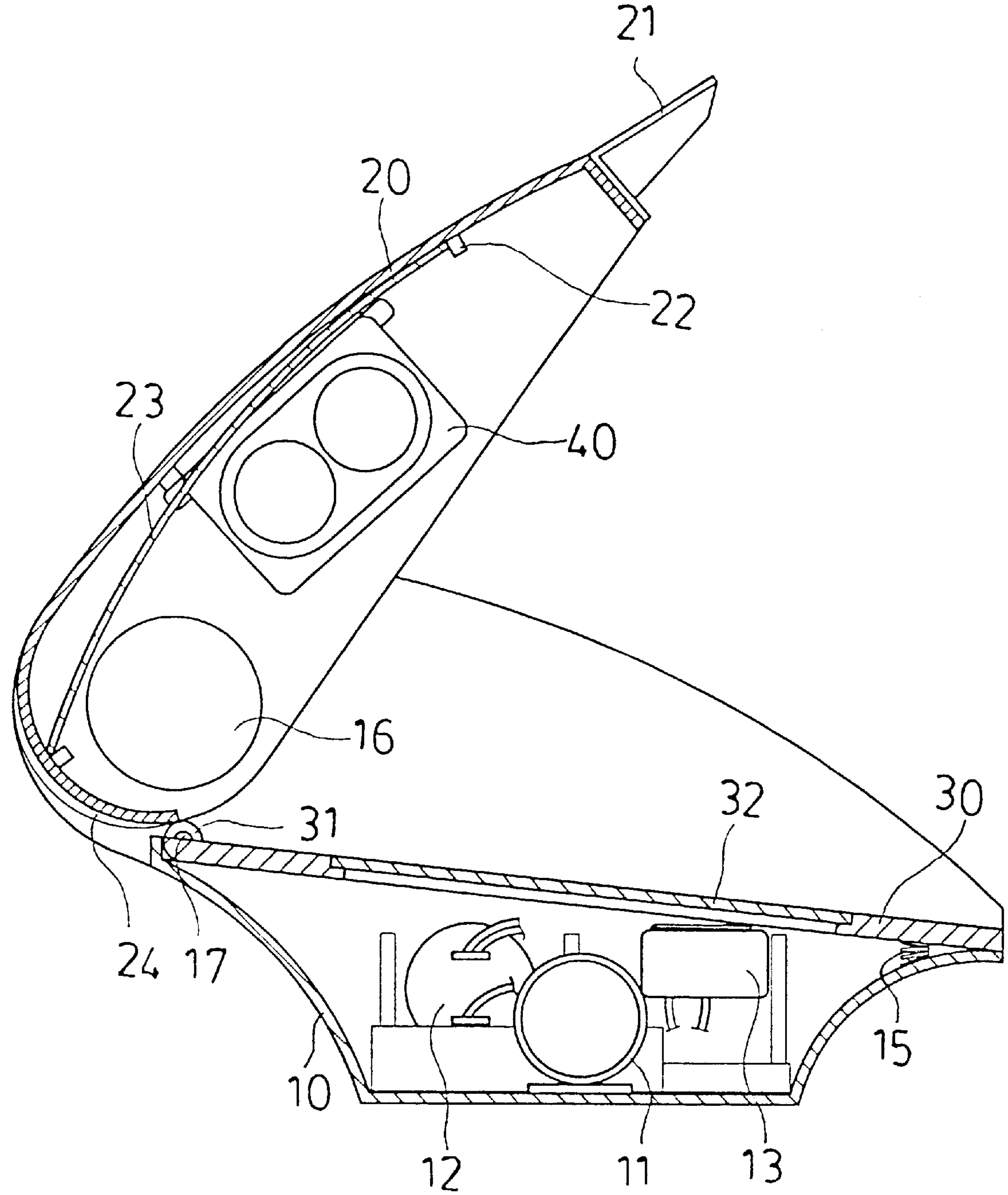
FIG. 4B is similar to FIG. 4A but showing the mat depressed, the microswitch triggered.
Figure 6:
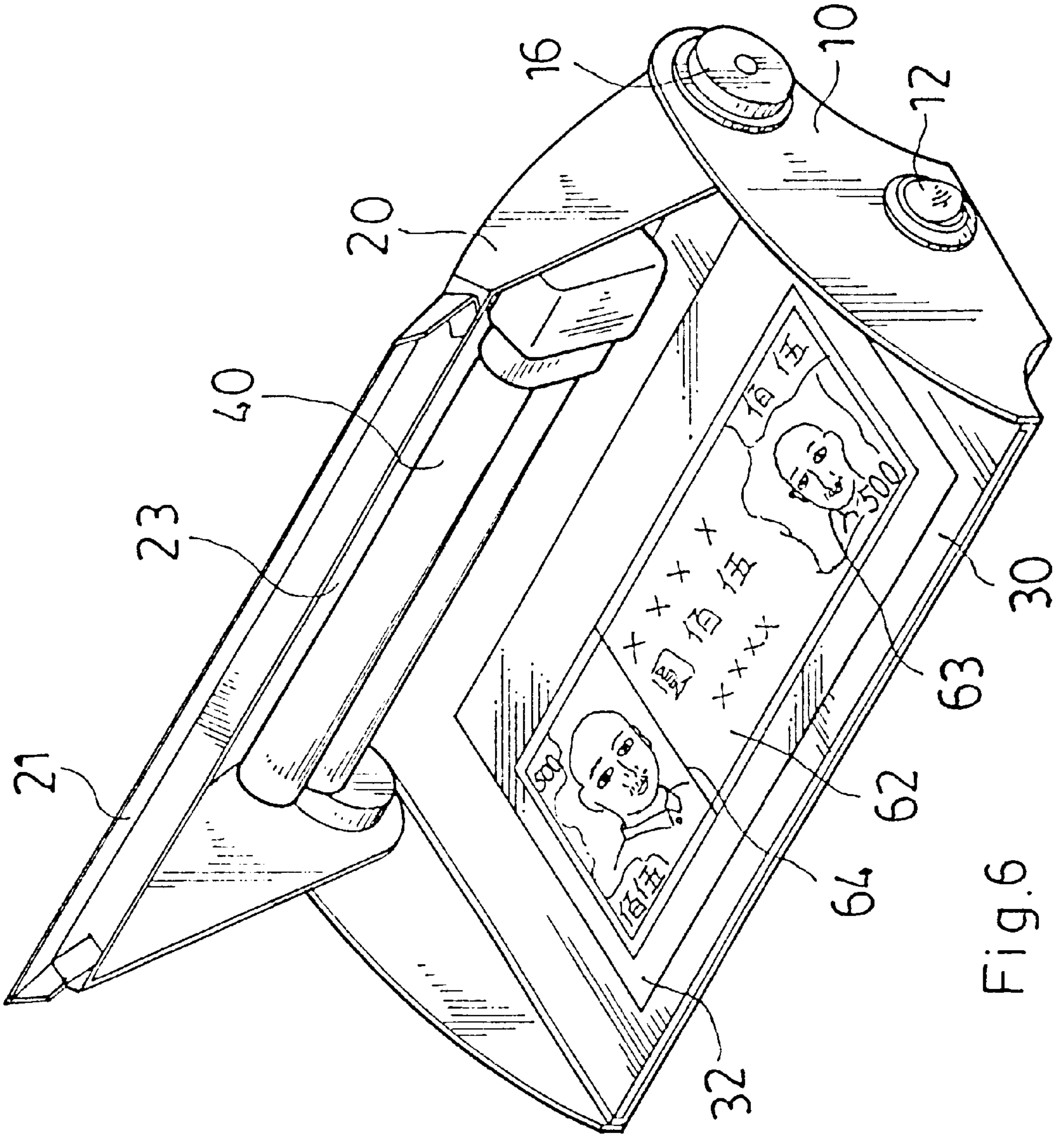
FIG. 6 shows another application example of the present invention.
Figure 7:
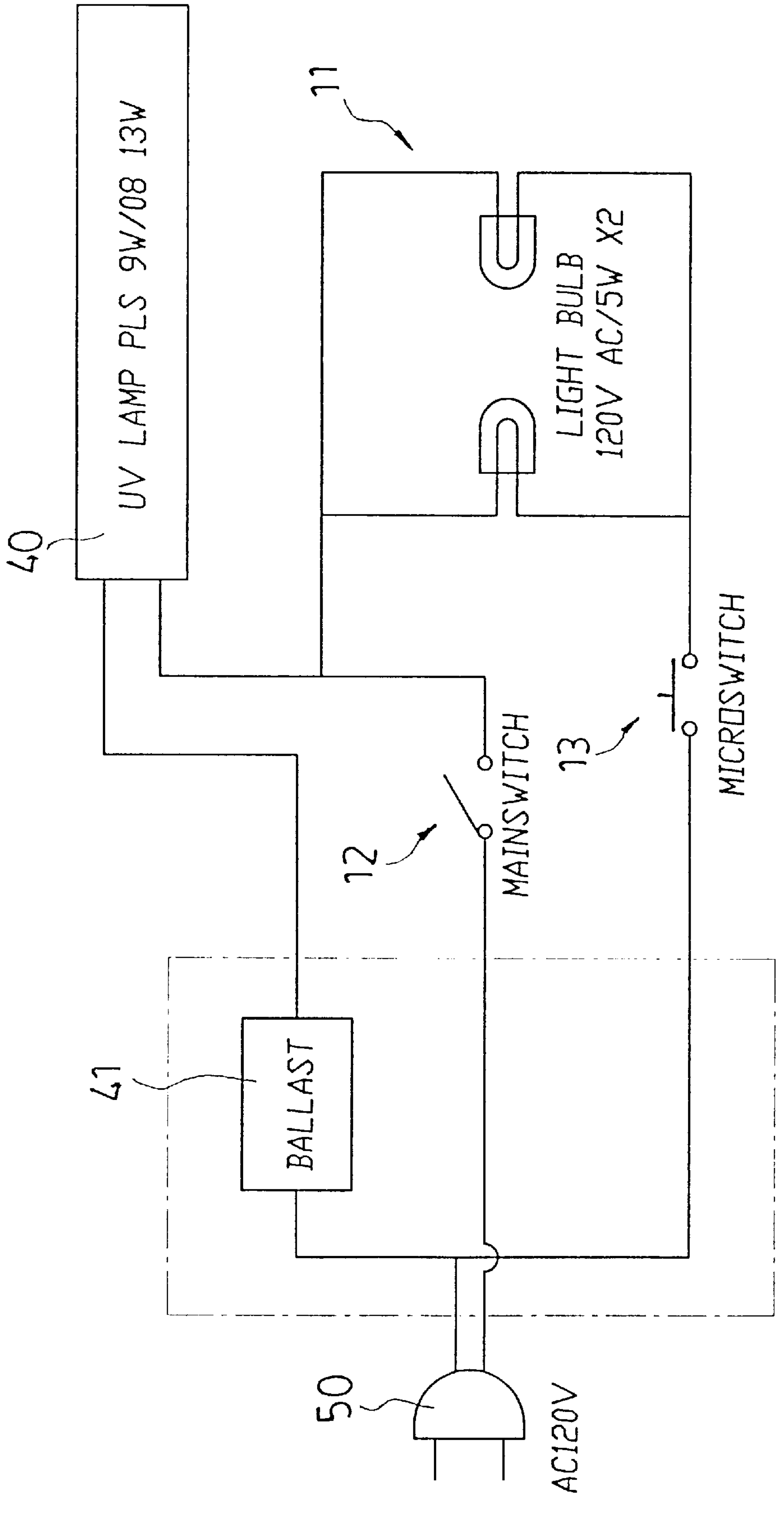
FIG. 7 is a circuit diagram of the present invention.

32 at the mat 30 (see FIG. 6), and then the mat 30 is pressed downwards against the spring members 15 to touch the microswitch 13 (see FIG. 4B), causing the incandescent lamps 11 to be turned on. When turning on the incandescent lamps 11, the light of the incandescent lamps 11 passes through the semitransparent center area 32 of the mat 30 and the paper currency 62, causing the embossed seal 63 to be shown and the authenticity recognition line 64 to be shown at the paper currency (see FIG. 6).

As indicated above, the ballast 41, the incandescent lamps 11 and the ultraviolet lamp 40 are separately arranged and then connected to the electric plug 50, the size of the apparatus can be minimized. Therefore, the apparatus is compact, and convenient for carrying by hand. Furthermore, because both the incandescent lamps 11 and the ultraviolet lamp 40 are provided, the apparatus is practical for recognizing the authenticity of credit cards as well as paper currency.

Figure 8:
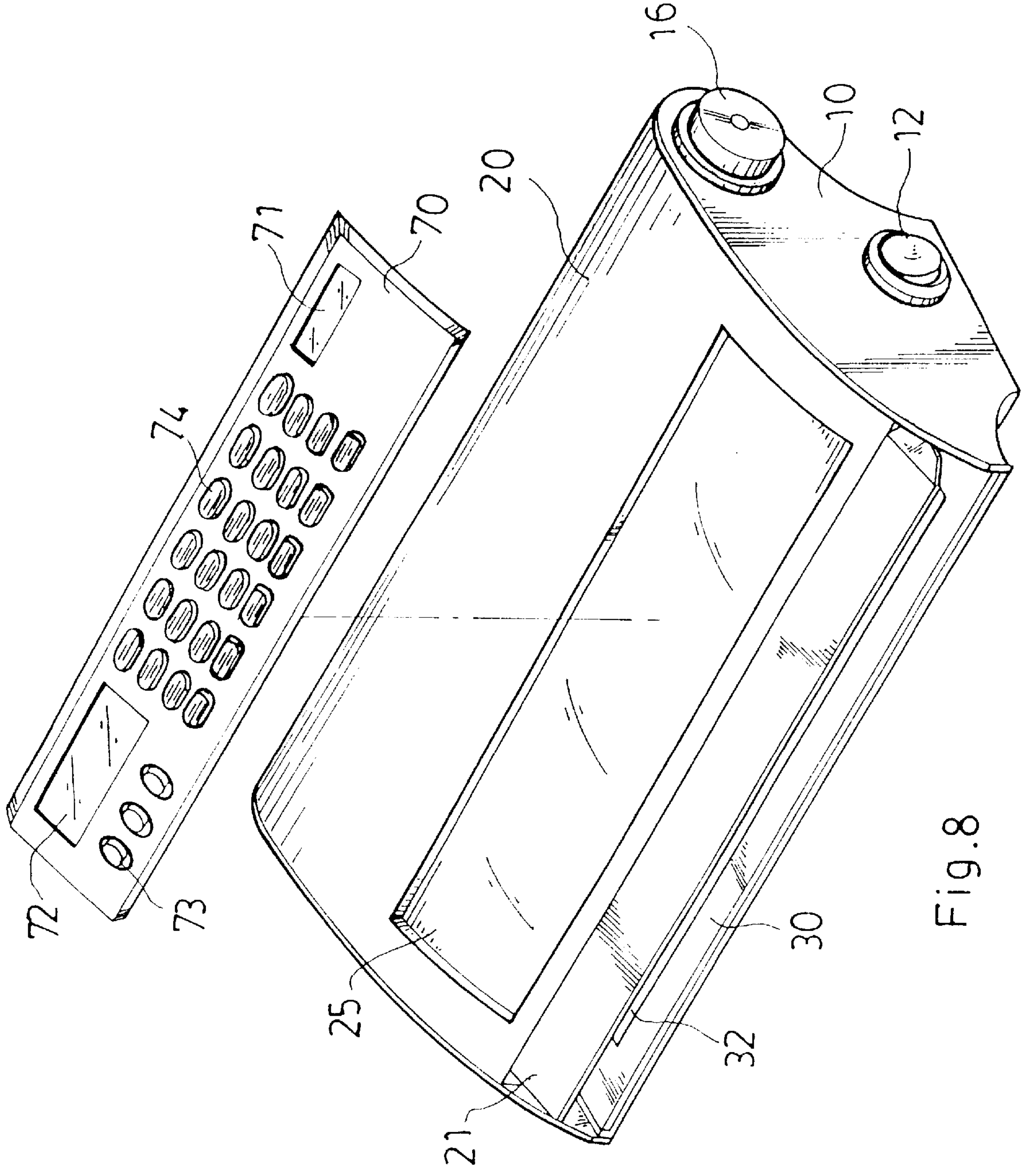
FIG. 8 is an exploded view of an alternate form of the present invention.
Figure 9:
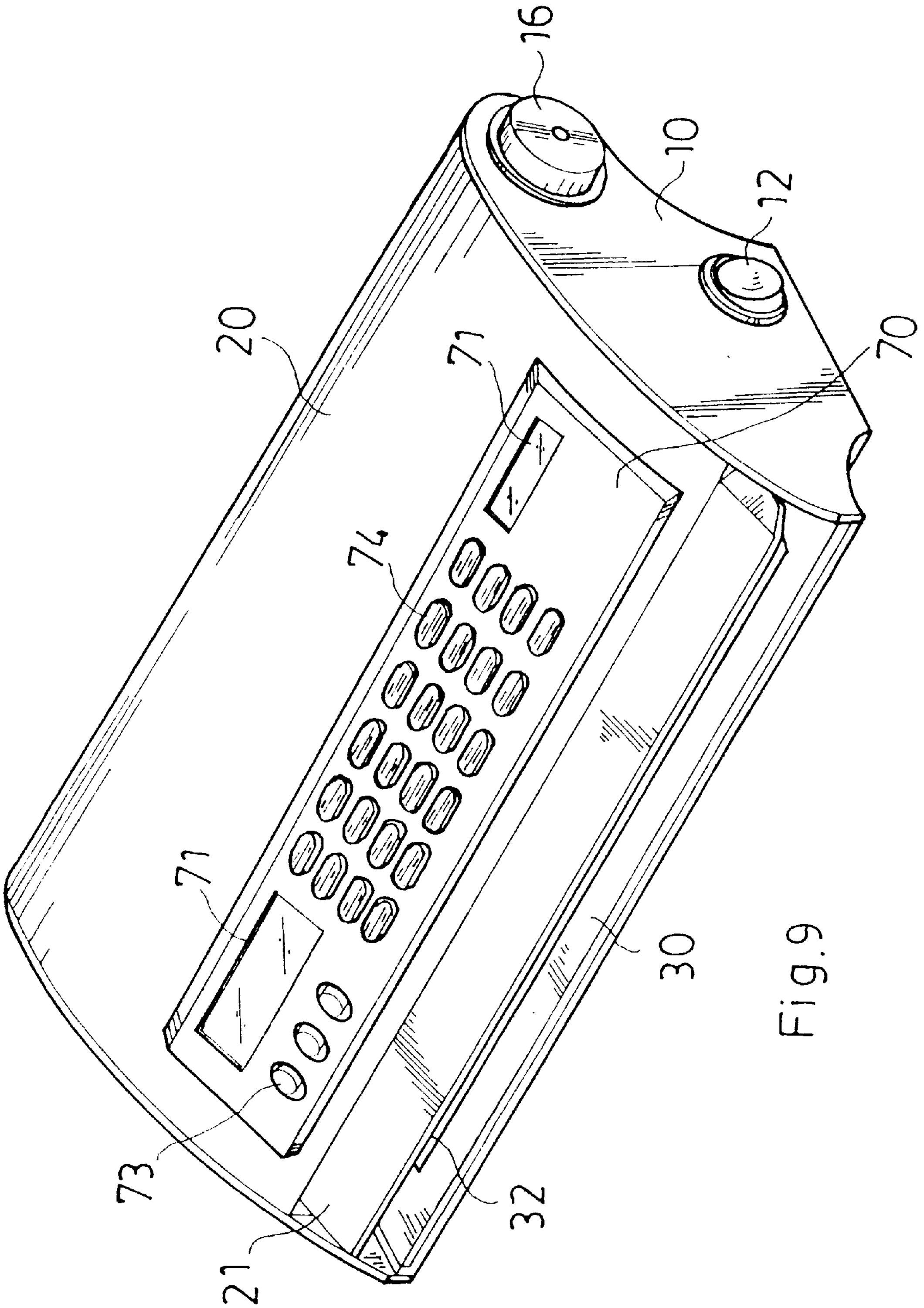
FIG. 9 is an assembly view of the alternate form shown in FIG. 8.

Referring to FIGS. 8 and 9, the lift cover 20 has a recessed calculator mount 25 at its top side wall, and a calculator 70 is mounted in the recessed calculator mount 25 at the lift cover 20. The calculator 70 comprises a solar panel 71 for converting sunlight into electric energy, a display panel 72 for the digital display of data, clear and function keys 73, and a set of number entry keys 74 for data entry and mathematical operation.

What is claimed is:

1. An apparatus for recognizing the authenticity of paper currency, credit cards, and the like, the apparatus comprising:

a casing, said casing comprising two pivot shafts bilaterally disposed at a rear side thereof, said pivot shafts each having a raised portion at an inner side;

a mat pivoted to said casing for holding a paper currency, credit card, or the like for recognition, said mat comprising two eyed lugs bilaterally disposed at a rear side thereof and respectively pivoted to the raised portions at said pivot shafts, and a semitransparent center area; incandescent lamp means mounted inside said casing and controlled to emit light through the semitransparent center area at said mat from a bottom side;

a lift cover pivoted to the pivot shafts at said casing for covering said casing, said lift cover comprising a plurality of locating rods on the inside;

an ultraviolet lamp mounted inside said lift cover;

resilient reflector means mounted inside said lift cover and secured to said locating rods to reflect light from said ultraviolet lamp toward said mat; a ballast;

an electric plug connected to said incandescent lamp, and said ultraviolet lamp through said ballast; and switch means for controlling the operation of said incandescent lamp means and said ultraviolet lamp.

2. The apparatus of claim 1 wherein said switch means comprises a main switch for controlling the transmission of power supply from said electric plug to said incandescent lamp means and said ultraviolet lamp, and a microswitch controlled by said main switch to turn on/off said incandescent lamp means.

3. The apparatus of claim 1 wherein said lift cover comprises a semitransparent front shade through which the light of said incandescent lamp means and said ultraviolet lamp passes when said lift cover is closed on said casing.

4. The apparatus of claim 2 wherein said casing comprises two spring holders bilaterally provided at a horizontal front flange thereof, and two spring members respectively mounted on said spring holders to support said mat above said microswitch, enabling said microswitch to be maintained off, or triggered by said mat to switch on said incandescent lamp means when pressing said mat downwards against said spring members.

5. The apparatus of claim 1 wherein said casing comprises a plurality of radiating fins at a back side thereof for dissipation of heat from said incandescent lamp means and said ultraviolet lamp.

6. The apparatus of claim 1 further comprising a calculator mounted on said lift cover.

* * * * *